United States Patent [19]

Russell

[11] 3,775,074

[45] Nov. 27, 1973

[54] METHOD AND APPARATUS FOR PROCESSING GLASS AND FORMING FIBERS THEREFROM

[75] Inventor: Robert G. Russell, Granville, Ohio

[73] Assignee: Owens-Corning Fiberglas Corporation, Toledo, Ohio

[22] Filed: Nov. 2, 1970

[21] Appl. No.: 86,359

Related U.S. Application Data

[63] Continuation of Ser. No. 760,554, Sept. 18, 1968, abandoned.

[52] U.S. Cl............................... 65/2, 65/8, 65/15, 65/116, 161/172
[51] Int. Cl............................................ C03b 37/02
[58] Field of Search .................... 65/1, 2, 3, 11 N, 65/11 R, 12, 21, 114–116, 8, 106; 161/172

[56] References Cited
UNITED STATES PATENTS

| 2,919,970 | 1/1960 | Russell | 65/11 WX |
| 3,347,648 | 10/1967 | Krakauer et al. | 65/3 |
| 3,410,672 | 11/1968 | Lajarte | 65/3 |
| 3,475,894 | 11/1969 | Wilke et al. | 65/2 X |
| 3,501,560 | 3/1970 | Howes et al. | 65/1 X |
| 3,242,032 | 3/1966 | Schott | 65/116 X |

Primary Examiner—Robert L. Lindsay, Jr.
Attorney—Staelin & Overman and Harry O. Ernsberger

[57] ABSTRACT

The disclosure embraces a method of and apparatus for processing heat-softenable mineral materials, such as glass, to form fibers or filaments, the disclosure embracing a method and means for quenching streams of glass and fibers or filaments formed therefrom by a liquid environment at the region of delivery of the glass streams from a stream feeder for dissipating heat to condition the viscosity of the glass of the streams for efficient attenuation, the effect of the quenching being to impart irregular or roughened surfaces to the attenuated glass fibers or filaments.

14 Claims, 15 Drawing Figures

INVENTOR.
ROBERT G. RUSSELL

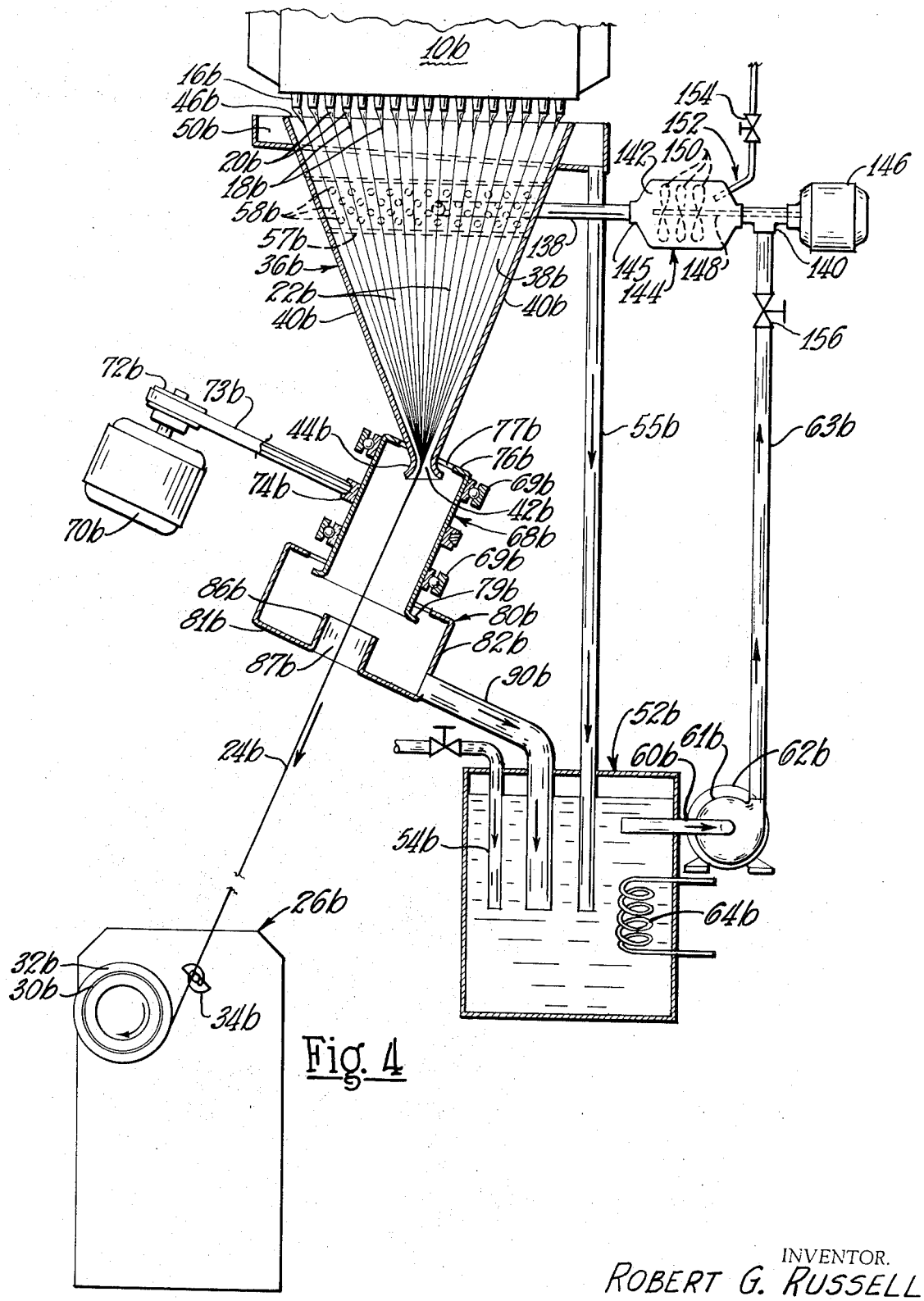

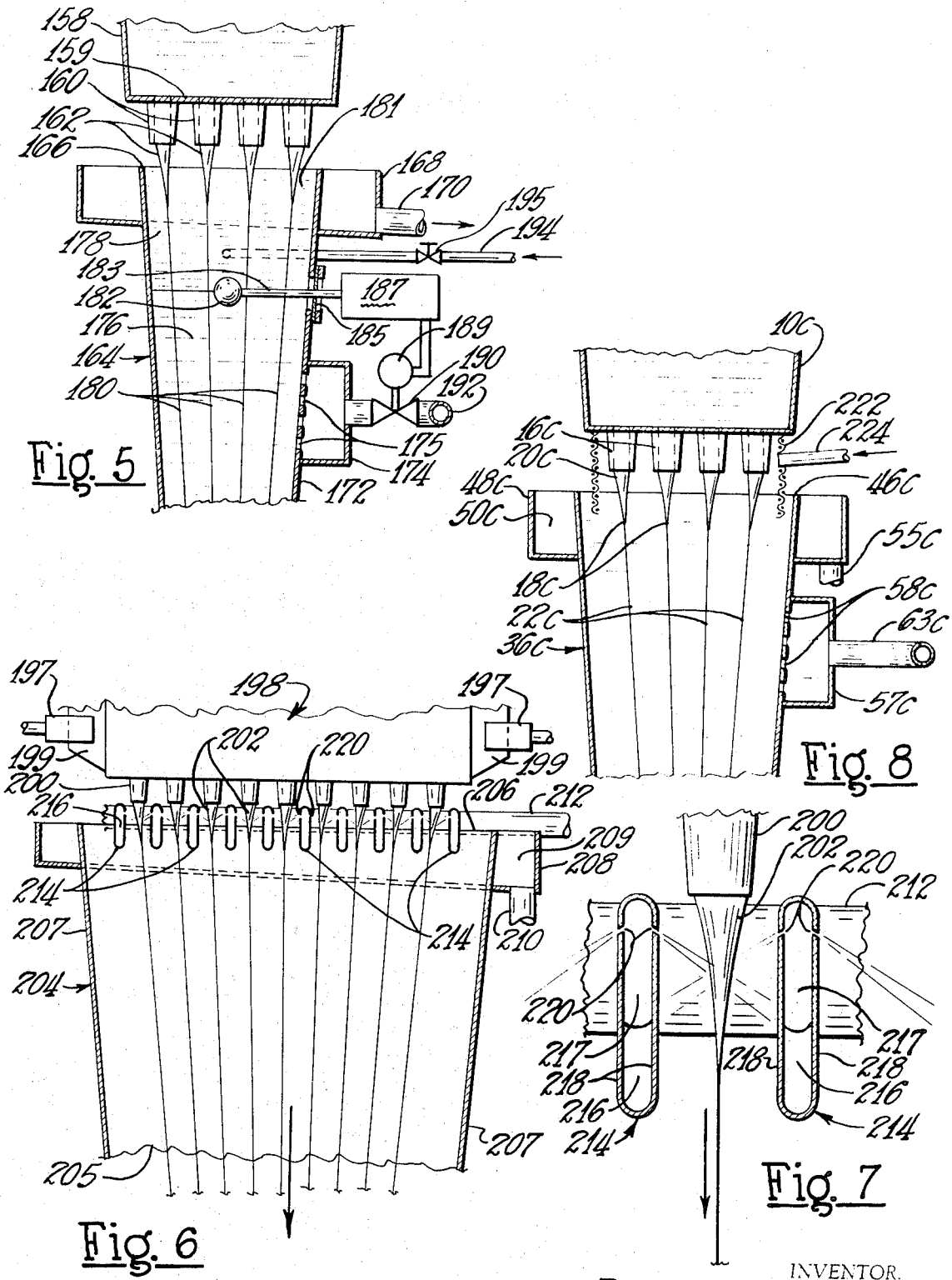

INVENTOR.
ROBERT G. RUSSELL

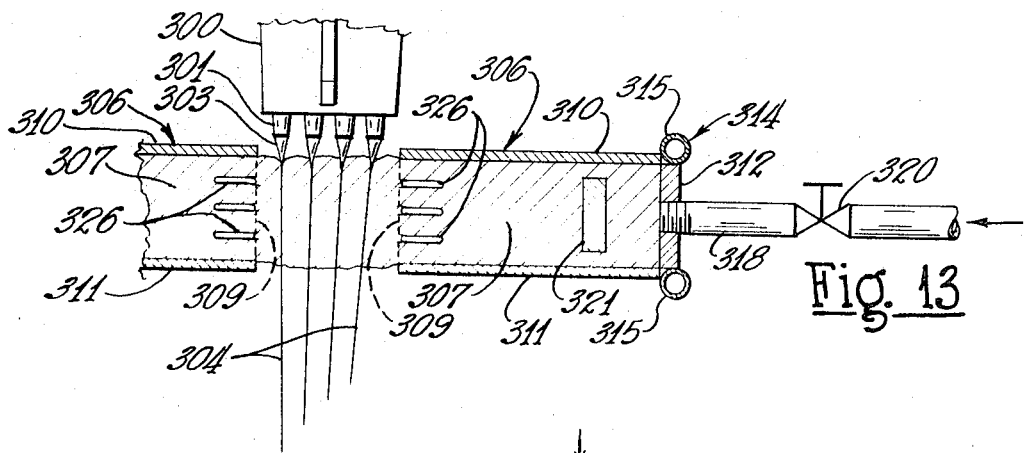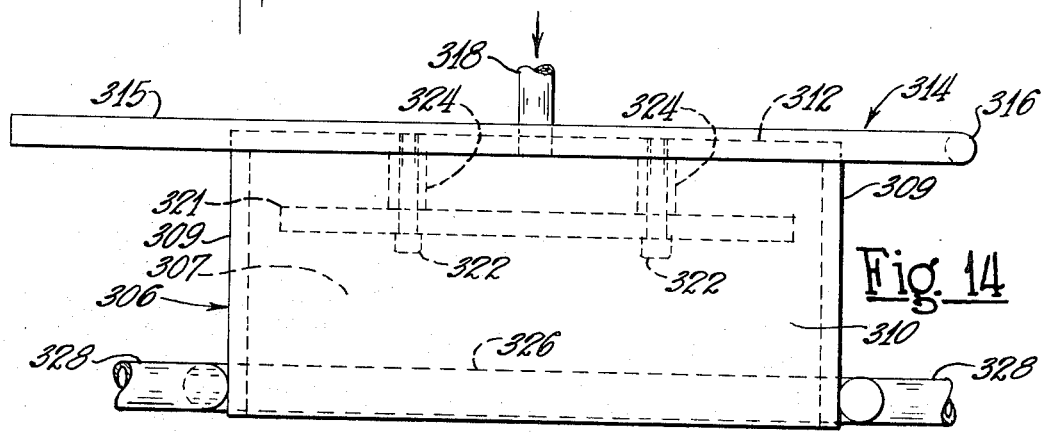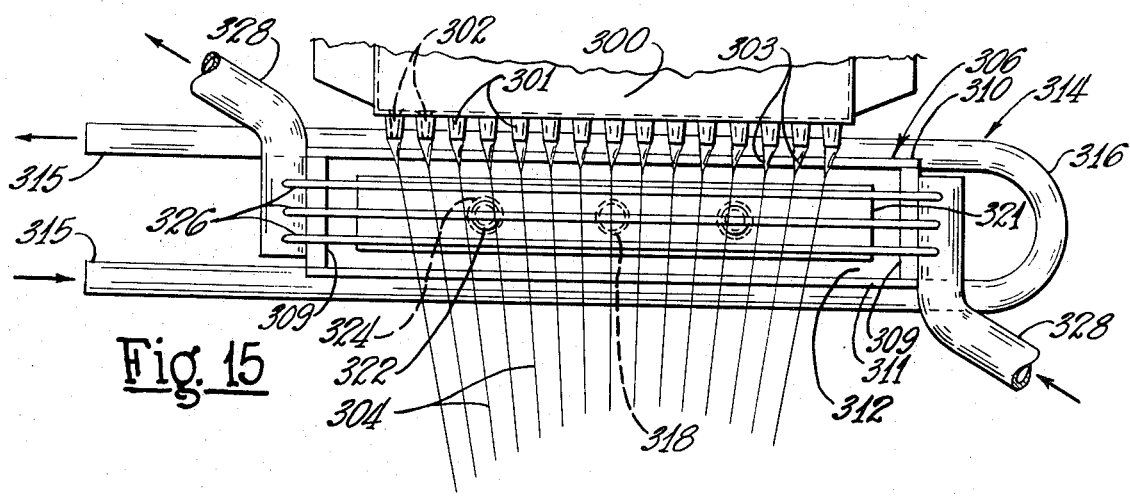

METHOD AND APPARATUS FOR PROCESSING GLASS AND FORMING FIBERS THEREFROM

This is a continuation of application, Ser. No. 760,554, filed Sept. 18, 1968 now abandoned.

This invention relates to method of and apparatus for processing heat-softenable mineral materials such as glass and more especially forming or attenuating heat-softened glass to fibers or filaments.

In the formation of filaments or fibers of glass, it has heretofore been a practice in forming glass filaments to flow glass streams from a stream feeder through orificed projections on the feeder floor and to attenuate the glass streams into continuous filaments or fibers by winding a strand of the filaments upon a rotating collector, the winding of the filaments on a collector attenuating the streams to filaments. It has been found that in order to deliver streams of glass from a feeder and secure uniformity of streams that the glass temperature in the feeder be sufficiently high to maintain the glass at a low viscosity or liquidus condition, the viscosity of which is too low for efficient attenuation of the streams of glass to filaments. It has been conventional to provide means adjacent the cones of glass at the delivery region of the feeder for transferring or conveying away sufficient heat from the cones of glass to thereby increase the viscosity of the glass so that the glass may be successfully attenuated into filaments. One method of transferring or dissipating heat from the cones of glass is through the use of metal shields or fins disposed between adjacent rows of the glass streams, the shields connected with a manifold through which a cooling or heat transferring fluid is circulated to convey away heat absorbed by the shields and render the glass streams of a viscosity suitable for attenuation to filaments.

Glass filaments attenuated in the conventional manner have relatively smooth surfaces and the application of a size or coatings of various materials to the smooth surfaced filaments have presented difficulties in securing an effective bond with the filaments. The use of metal heat-transferring or cooling fins or shields imposes a limitation upon the group spacing of orificed projections or stream flow orifices because of the necessity of disposing the metal fins between adjacent rows of cones of glass of the streams emanating from the orifices or orifice projections so that the number of stream flow orifices in a given stream feeder area is limited. The trend in glass fiber or filament development is the production of finer filaments or fibers so that more filaments may be embodied in a strand and thereby increase the strength of the strand as well as to render the strand more flexible.

The present invention embraces a method of establishing a heat-transfer environment adjacent the cones of glass or through which the streams of glass or filaments are drawn which is effective to transfer or dissipate heat from the cones of glass or filaments and thereby increase the viscosity of the cones of glass to enable successful attenuation of the glass streams to filaments enabling the delivery of an increased number of glass streams in a given area of a stream feeder floor.

An object of the invention embraces a method of processing glass in forming fibers therefrom involving moving the glass of the streams through a liquid heat-dissipating medium which is effective to improve attenuation and provide for the delivery of an increased number of streams in a given area whereby more filaments having substantially uniform characteristics may be simultaneously attenuated from a stream feeder.

Another object of the invention embraces a method of subjecting glass streams delivered from a stream feeder to a liquid environment effective to quench the streams or filaments attenuated therefrom whereby the attenuated filaments are endowed with an irregular or roughened surface, a characteristic which provides greater flexibility of the filaments and increased resistance to fracture.

Another object of the invention embraces a method of quenching fibers or filaments being attenuated from glass streams in a manner whereby the surfaces of the filaments are of roughened or irregular character which improves the adherence of coatings, sizing, dyes or other materials to the filaments.

Another object of the invention embraces a method of quenching the glass streams or filaments involving moving the filaments or fibers through a body of liquid and stripping excess liquid from the fibers or filaments as they are collected into a package.

Another object of the invention is the provision of a method of liquid quenching of glass of the streams at or adjacent the region of attenuation of the streams to filaments, the effect of the quenching being to provide filaments having increased surface areas of irregular or nonsmooth configuration whereby the filaments are rendered more compatible to receive coatings or sizing which are adhered or bonded to the roughened surfaces more readily than on a smooth surfaced filament.

Another object of the invention embraces a method of subjecting streams of glass to an aerated liquid to condition and control the viscosity of the glass for efficient attenuation and for roughening the surfaces of the fibers or filaments thereby increasing the flexibility of the fibers or filaments.

Another object of the invention resides in a method of projecting heat-softened bodies or streams of glass from a rotating centrifuge whereby the bodies or streams are attenuated into continuous filaments by centrifugal forces, the streams and filaments attenuated therefrom being delivered into a liquid environment effective to quench the glass streams and filaments, the method embracing stripping the liquid from the filaments as the filaments are advanced from the liquid environment.

Another object resides in the production of an attenuated fiber or filament having a roughened surface.

The invention embraces the establishment and maintenance of an environment of liquid with gas dispersed therein adjacent a stream feeder whereby glass streams delivered from the stream feeder move through the environment thereby effecting transfer of heat from the glass and increasing the viscosity of the glass of the streams suitable for attenuation to filaments.

Another object of the invention embraces a method of establishing and maintaining an environment of foam liquid adjacent a stream feeder whereby streams of glass from the feeder move through and are engaged by the foam and wherein the foam may contain a lubricant, size or other material for deposition on the filaments concomitantly with attenuation of the streams to filaments.

The invention embraces an apparatus for the treatment of continuous filaments attenuated from glass streams including an arrangement for maintaining a liquid environment at the region of attenuation of the glass streams, the attenuated filaments being drawn through the liquid and the excess liquid stripped from the filaments and circulated for reuse.

Another object of the invention is the provision of an apparatus for maintaining a liquid foam environment at the stream delivery region of a glass stream feeder for dissipating or transferring heat away from the glass streams to condition the glass for attenuation.

Another object of the invention resides in an apparatus for delivering and maintaining a quenching medium adjacent the stream flow region of a stream feeder wherein the quenching medium may contain a size or coating material whereby filaments attenuated from the streams acquire a coating or size as the filaments move through the quenching medium.

Another object of the invention is the provision of an apparatus embodying means for delivering and maintaining a controlled environment of foam or aerated liquid adjacent the glass streams at the region of attenuation whereby heat is transferred from the glass streams to the foam in an amount sufficient to increase the viscosity of the glass to provide efficient attenuation of the glass to filaments.

Still another object of the invention is the provision of an arrangement wherein heat-softened glass is centrifuged by a rotating centrifuge to form continuous centrifuged filaments, the centrifuged filaments being delivered into a heat absorbing medium quenching the filaments, the heat transferring medium being stripped from the continuous filaments prior to collection of filaments at a collecting station.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

FIG. 4 is a view similar to FIG. 1 illustrating a modified form of apparatus for performing the method of the invention;

FIG. 5 is an enlarged fragmentary sectional view of an apparatus establishing a liquid environment for treatment of glass filaments wherein the filaments are moved through two liquids;

FIG. 6 is a schematic sectional view illustrating tubular means for engaging filament quenching liquid with the glass streams at and adjacent the region of attenuation;

FIG. 7 is an enlarged fragmentary view of liquid delivery means shown in FIG. 6;

FIG. 8 is a view similar to FIG. 5 illustrating an arrangement for delivering a gas adjacent the liquid quenching environment for treatment of the glass;

FIG. 13 is an elevational view of a stream feeder and an arrangement for establishing and maintaining liquid foam at the stream flow region;

FIG. 14 is a plan view of a means for delivering foam to the region of the glass streams, and FIG. 15 is a side elevational view of the arrangement shown in FIG. 13.

The method and apparatus of the invention are particularly usable in establishing and maintaining a liquid environment for quenching streams of glass adjacent a stream feeder and fibers or filaments attenuated from the streams or an environment involving a liquid with gas dispersed therein to thereby convey heat away from the streams and increase the viscosity of the glass to an attenuable condition. The method may be employed to simultaneously coat the fibers or filaments with liquid or other material.

Figures 1, 2:
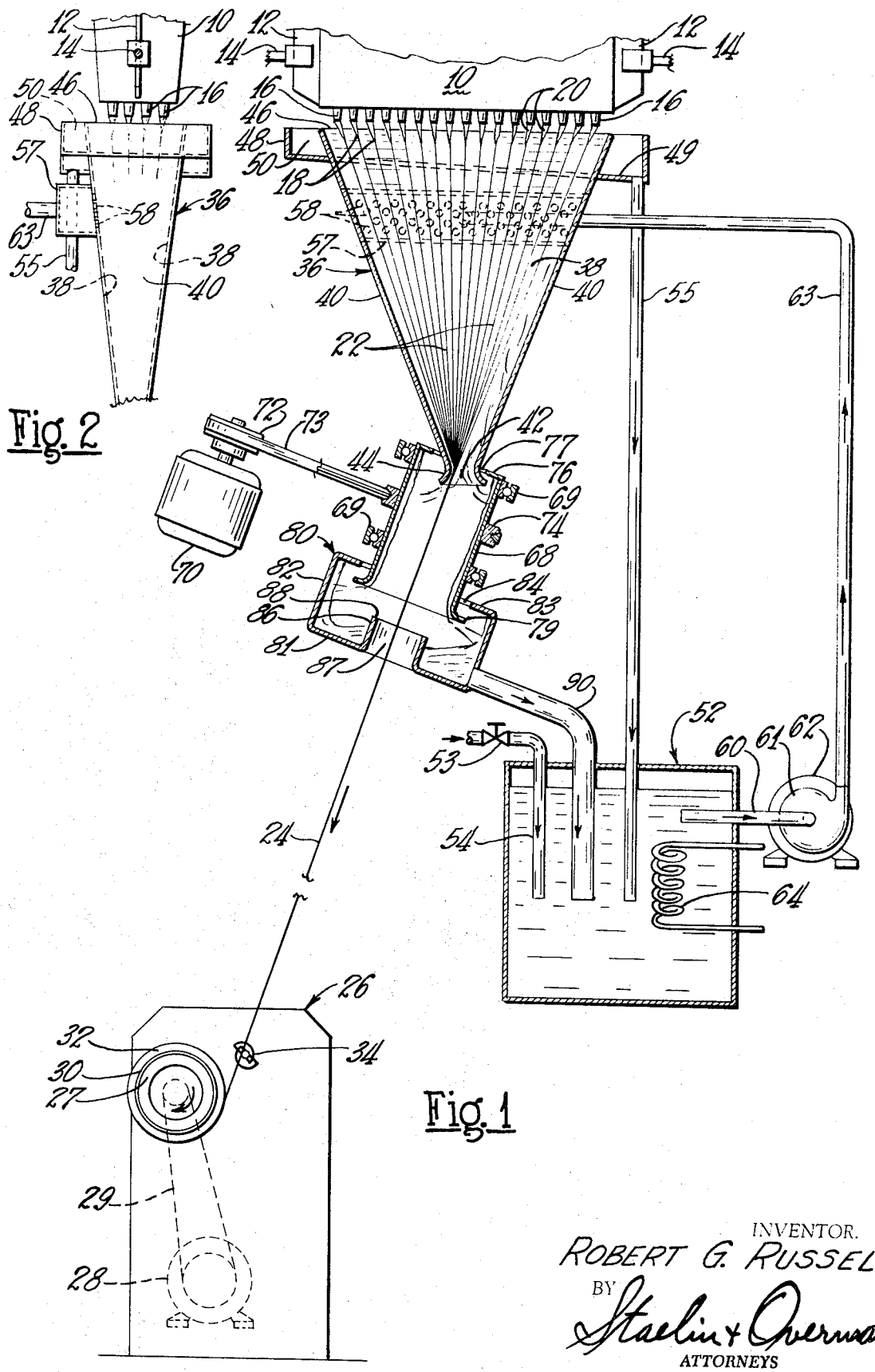
FIG. 1 is a semi-schematic elevational view showing a form of apparatus for carrying out the method of the invention for processing fibers or filaments in a liquid environment.
FIG. 2 is a side elevational view of a portion of the apparatus shown in FIG. 1.

Referring to the drawings in detail and initially to FIG. 1, the apparatus disclosed is of a character to establish and maintain a body of liquid such as water or a liquid environment adjacent the glass stream delivery region of a stream feeder whereby the liquid contacts the cones of glass of the streams and the filaments or fibers attenuated from the streams, the fibers or filaments being drawn through the liquid, converted into a strand and the strand wound into a package or otherwise collected. The apparatus includes a stream feeder or bushing 10 provided with terminal lugs 12 to which current conductors 14 may be connected for heating the stream feeder in a conventional manner.

The stream feeder 10 receives pieces or spherical bodies of prerefined glass which may be reduced to a molten condition by electric energy passing through the feeder. The stream feeder 10 may be arranged to receive refined heat-softened or molten glass from a conventional forehearth construction associated with a glass melting furnace. Where the stream feeder receives heat-softened glass from a forehearth, the electric energy passing through the feeder may be controlled so as to maintain the glass at a desired temperature and viscosity at which streams of glass of uniform characteristics may be flowed from the feeder.

The feeder floor is preferably fashioned with rows of depending projections or tips 16, each having a flow passage therein providing an outlet or orifice through which a stream 18 of glass is flowed from the feeder. Each glass stream, at the region adjacent a projection or tip, is in the form of a cone 20. Each of the streams is attenuated to a continuous filament or fiber 22, the filaments being converted to form a strand 24. A winding machine or apparatus 26 is provided with a rotatable collet 27 driven by a motor 28 through a driving belt 29 in a conventional manner.

In the arrangement illustrated, the strand 24 is wound upon a collector tube 30 telescoped onto the collet 27 to form a package of strand 32, the winding of the strand on the collector providing the means for attenuating the glass streams 18 to filaments. A rotatable traverse means 34 carried by the winding machine 26 is reciprocable lengthwise of the collet 27 to distribute the strand 24 lengthwise of the package 32. If desired, a pull wheel arrangement such as shown in Smock and Fulk U.S. Pat. No. 3,295,942 may be employed for attenuating the filaments.

The apparatus embodies an arrangement for establishing and maintaining a body of liquid or liquid environment at the region of delivery of streams of glass from the feeder whereby portions of the cones 20 of glass and filaments being attenuatd therefrom are quenched by the liquid, the filaments being drawn through and in contact with the liquid.

Disposed beneath the stream feeder 10 is a housing, enclosure or shield 36 of inverted, generally pyramidal shape, as shown in FIGS. 1 and 2. The shield or enclosure 36 has opposed converging side walls 38 and convergingly arranged end walls 40.

The upper end of the housing 36 is open and is of a dimension to receive the streams 18 of glass delivered through the passages or orifices in the depending projections 16. The lower end regions of the converging side and end walls 38 and 40 are curved or shaped to provide a restricted passage or outlet 42, the portions of the walls below the restriction 42 being preferably curved outwardly as shown at 44. Means is provided for continuously delivering liquid into the enclosure 36 at a rate to maintain the enclosure 36 filled with the liquid to a level defined by the rim or upper edge 46 of the enclosure 36.

Surrounding the upper end region of the enclosure 36 is a member 48 of rectangular shape having a floor 49 defining a trough or mote 50 into which excess liquid may flow over the upper edge 46 of the enclosure 36. A receptacle, tank or container 52 is provided containing a supply of liquid for the liquid environment adjacent the cones of glass and the filament forming region. A pipe 54 extending into the tank 52 is connected with a main liquid supply, such as water, so that the tank 52 is substantially filled with liquid during attenuating operations.

Valve means 53 is associated with the supply pipe 54 which may be manually controlled or automatically controlled by a liquid level control means (not shown) of conventional construction contained within the tank 52 for maintaining a predetermined quantity of liquid in the tank 52. The floor 49 of the overflow trough 50 is preferably inclined, as shown in FIG. 1, and is provided with a return pipe 55 joined with the floor 49 at its lowest point for returning to the tank 52 liquid overflowing into the trough 50.

Secured to a side wall 38 of the enclosure 36 is a manifold 57 and the adjacent portion of the wall 38 is fashioned with a plurality of passages or orifices 58. The container or tank 52 is provided with an outlet pipe 60 connected with a pump 61 of conventional construction driven by a motor 62, a pipe 63 connecting the outlet of the pump with the manifold 57. A heat exchanger or coil 64 is disposed in the tank 52 which may be supplied with a cooling medium or a heating medium for controlling the temperature of the liquid in the tank 52 so as to maintain the temperature of the liquid substantially constant.

The restricted outlet 42 for the enclosure 36 is made as small as practicable to accommodate the passage of the strand 24, a region of the inner surface of the restriction 42 providing a means for gathering or converging the individual fibers or filaments 22 into a group or strand 24.

The pipes 60 and 63 and the pump 61 are of a capacity to maintain the enclosure 36 filled with the liquid, such as water so that the liquid level is maintained at the upper edge 46 of the enclosure, the pipes 60 and 63 and pump 61 being of a capacity to feed an excess of liquid into the enclosure 36 as liquid in the enclosure is continually flowing downwardly through the outlet 42.

Means is provided for returning or conveying the liquid moving through the restriction 42 into the tank 52. Disposed beneath the enclosure 36 is a thin walled tubular body or rotor 68 journally supported in antifriction bearings 69, the bearings being mounted upon a frame means (not shown) of conventional construction. As shown in FIG. 1, the axis of rotation of the tubular rotor 68 is substantially parallel with the linear path of movement of the strand 24 but may be mounted for rotation about an axis out of parallelism with the strand if desired.

Driving means for rotating the tubular rotor 68 comrises a motor 70 equipped with a pulley or sheave 72 accommodating a driving belt 73, the latter engaging a sheave 74 surrounding and secured to the tubular rotor 68. The upper end of the rotor 68 is preferably fashioned with an inwardly-extending circular flange 76, the inner edge of the flange defining an opening 77 through which extends the lower region of the housing or enclosure 36. The lower end of the tubular rotor 68 terminates in an outwardly extending circular flange 79.

Disposed adjacent and embracing the lower region of the hollow rotor 68 is a thin-walled receptacle or collector 80 which receives and collects liquid delivered from the curved flange 79 at the lower end of the rotating tubular sleeve or rotor 68. The receptacle 80 is fashioned with an annular bottom wall or floor 81, a circular cylindrical side wall 82 and an inwardly extending flange 83 at its upper end, the flange 83 defining a circular opening 84 accommodating the lower region of the rotating sleeve 68.

The bottom wall 81 has a centrally-disposed upwardly-extending circular flange 86 defining a passage or opening 87 to accommodate travel of the strand 24 toward the winding machine 26. The upper edge 88 of the circular flange 86 should be sufficient distance above the floor 81 to receive and accommodate liquid discharged from the lower end of the rotatable sleeve 68 without the liquid flowing over the edge 88 and through the passage 87.

A pipe or tubular member 90 connected with the receptacle or collector 80 returns the liquid from the chamber provided by the collector 80 to the tank 52. The pipe 90 is of a cross sectional area greater than the cross sectional area of the restricted passage 42 so that the liquid flowing through the passage 42 by gravity is returned to the tank 52.

The method of treating or quenching the glass of the streams and the fibers or filaments 22 through the use of the arrangement shown is as follows: The motor 70 is energized to rotate the rotatable sleeve 68 and the motor 62 energized to operate the pump 61. The capacity of the pump 61 is such as to pump liquid, such as water, from the tank 52 into the manifold 57 through the openings 58 into the enclosure or shield 36 at a higher rate than the rate of discharge of the water by gravity through the restricted passage 42 so that the frusto-conically shaped chamber 38 defined by the housing 36 is filled with water to a level determined by the upper edge 46 of the housing 36.

At said level, portions of the cones 20 of glass are beneath the level of the water in the housing 36. In start up, beads of glass are formed at the ends of the streams of glass which fall by gravity, assisted by the downward flow of water in the housing 36 and filaments trailing the beads move through the passage 42. The operator manually draws the group of filaments through the passage 87 by the use of a suitable tool and manually winds a few turns of the strand or group of filaments on the end region of the packaging collector 30.

The motor 28 of the winding machine 26 is energized to rotate the collet 27 and the packaging collector thereby winding the strand 24 on the end region of the collector until the packaging collector has attained a predetermined speed for proper attenuation of the filaments 22.

When this speed is attained, the strand 24 is engagd with the rotatable and reciprocable transverse 34 and winding of the strand of filaments is begun on the packaging region of the collector tube 30.

The water or other liquid in the shield or housing 36 continuously flows downwardly by gravity through the restriction 42 and engages the interior surface of the rotating sleeve 68, the centrifugal forces of rotation of the sleeve 68 influencing the water whereby it is discharged from the periphery of the rotating flange 79 into the stationary collector or receptacle 80 and is returned through the pipe 90 into the tank 52. As water or other liquid is being pumped from the tank 52 into the housing or shield 36 at a greater rate than the water is flowing downwardly through the restriction 42, the housing or shield 36 is maintained filled with water to the level defined by the upper edge 46 of the housing 36.

The inner surface of the housing 36 defining the restriction 42 is curved and serves to gather or converge the filaments into a strand 24. As the filaments are moving through the restriction 42 in a converging relation, they engage the inner surface of the portion 44 and such engagement or contact tends to wipe water from the filaments of the strand 24 so that there is a minimum of water adhering to the strand 24 being packaged on the collector tube 30.

As shown in FIG. 1, the cones 20 of glass adjacent the stream feeder tip 16 are immersed in the water or other liquid. Due to the high temperature of the molten glass of the cones, which may be 2200° F. or higher, the water or other liquid is volatilized which in the use of water, forms steam so that the nascent molten glass is not actually in contact with the liquid but is contacted by the steam. Through this method, heat is rapidly transferred from the molten glass to the liquid and the steam and the glass thereby reduced to an attenuating temperature suitable for attenuating the filaments 22 from the cones of glass which are quenched or rapidly cooled by the liquid.

Figure 12:
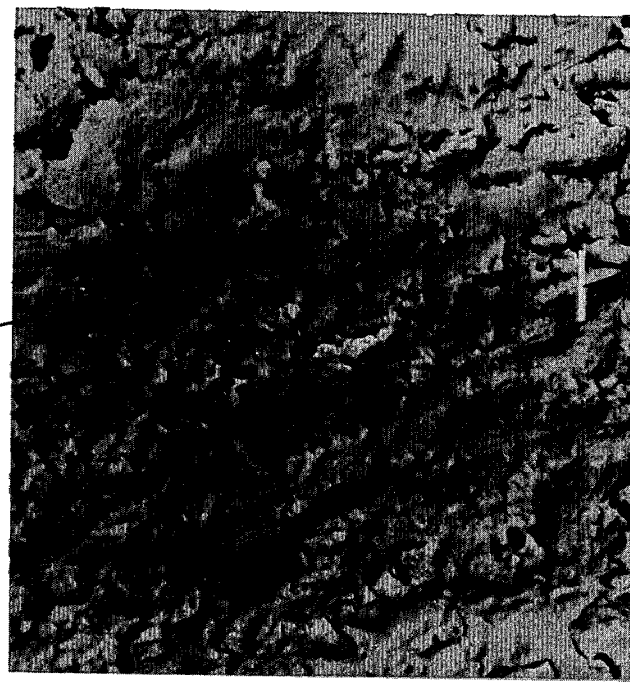
FIG. 12 is a highly magnified electron photomicrograph of the surface of a fiber or filament produced by the method or process of the invention.

It is found that the quenching of the cones of glass through this method causes an unsmooth or roughened surface to be formed on the fibers or filaments, and it is believed that this is attributed to the turbulence at the region of contact of the steam or other gas from the liquid with the nascent molten glass so that there is a rapid but irregular cooling of the glass, setting up surface stresses resulting in the roughened surfaces on the filaments. FIG. 12 is a drawing of an electron photomicrograph of the surface 92 of a liquid-quenched fiber or filament 22 fashioned by the herein described method. The extent of magnification of the fiber or filament surface 92 is indicated by comparison with the unit bar 93 which, in the illustration, represents one micron.

FIG. 12 illustrates the roughened surface of a filament, the surface configuration comprising a random distribution of lands and recesses which are irregular in shape, the recesses being of varying depths. It is found that the filaments or fibers having the roughened surface have advantages over conventional smooth surface filaments that have been heretofore produced and used extensively commercially. The filaments formed by quenching exhibit a substantially higher degree of flexibility than smooth surface filaments of substantially the same diameter.

The roughened or irregular surface configuration of the filament provides a means improving the adherence of coatings applied onto the filaments. The irregularities of the filament surface provide increased areas for reactions involving treatment of the surface of the filaments. The roughened surfaces of filaments, when the filaments are assembled or grouped into bundles or strands or when the strands are arranged in crossing relation provide for better abrasion resistance because the recesses and lands of the engaging filaments tend to adhere or interlock one to another as compared with smooth surface filaments, the latter tending to abrade one another upon relative movement.

Figure 3:
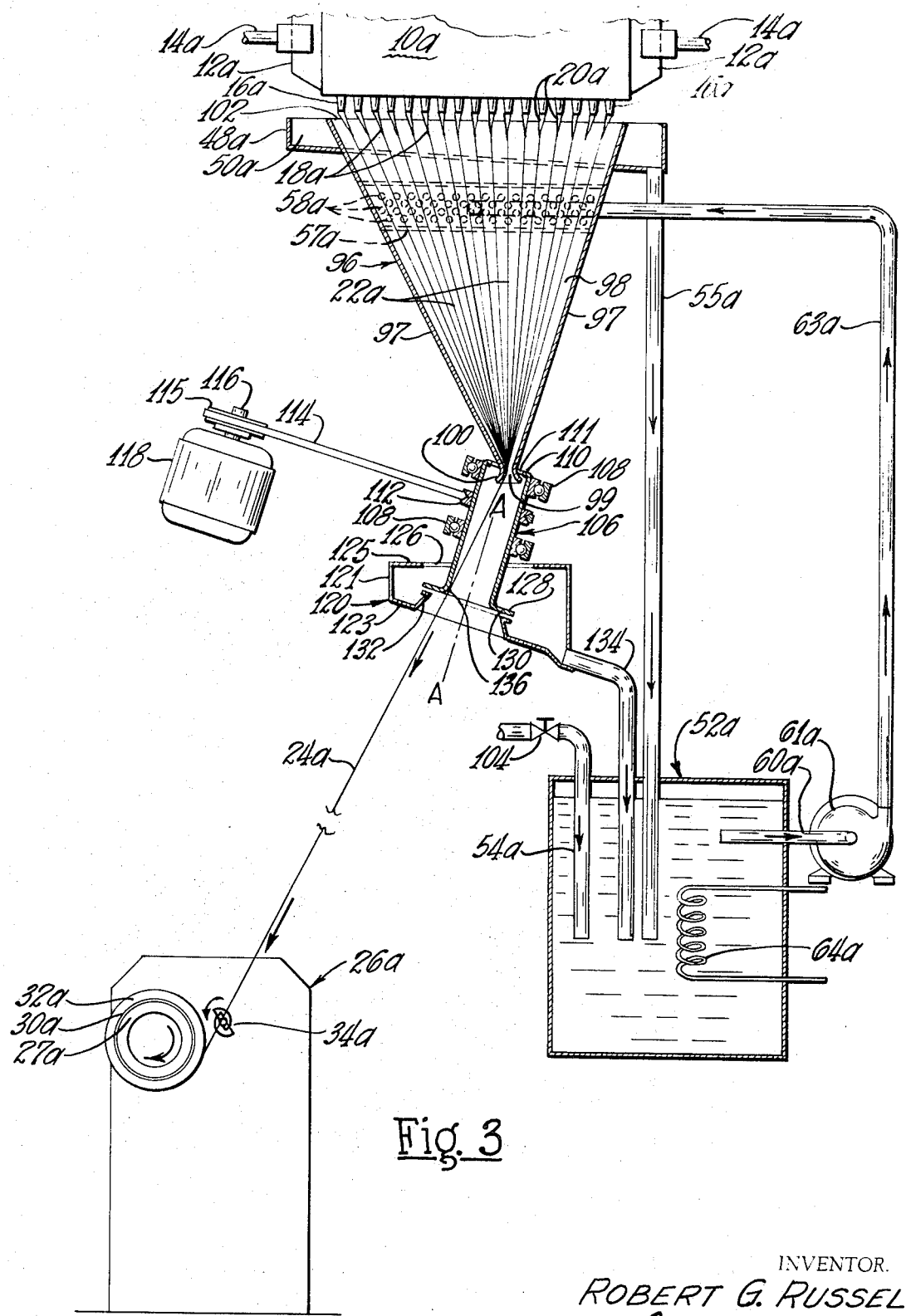
FIG. 3 is a view similar to FIG. 1 illustrating a modified form of apparatus for performing the method of the invention.

FIG. 3 illustrates a modified arrangement of apparatus for carrying out the method of the invention. A stream feeder or bushing 10a electrically heated by current conductors 14a is connected with terminals 12a.

The feeder floor is fashioned with orifices or passages in projections or tips 16a through which flow glass streams 18a, the cones of glass of the streams being illustrated at 20a. The filaments 22a attenuated from the streams are converged into a strand 24a, the strand being wound into a package 32a on a collector tube 30a mounted on a rotatable collet 27a of a winding machine 26a driven by an electric motor.

During formation of the package, the strand 24a is guided onto the package by a rotating and reciprocating traverse 34a. Disposed beneath the stream feeder 10a is a housing, receptacle or enclosure 96 of inverted generally pyramidal shape as in the form shown in FIGS. 1 and 2 having convergingly arranged end walls 97 and side walls 98, one of the side walls being shown in FIG. 2. The upper end of the housing or enclosure 96 is open to receive the streams 18a of glass delivered through the orifices in the projections 16a.

The lower end regions of the side and end walls 97 and 98 are converged and curved to form a restricted passage 99, portions of the walls below the restricted region being curved outwardly as shown at 100. The arrangement shown in FIG. 3 embodies a means similar to that shown in FIG. 1 for continuously delivering liquid into the housing, receptacle or enclosure 96 to maintain the housing filled with water or other vaporizable liquid to a level defined by the upper edge 102 of the enclosure. Surrounding the upper region of the enclosure 96 is a member 48a defining a trough or receptacle 50a providing for overflow of liquid over the upper edge 102 of the enclosure.

A tank 52a contains a liquid, such as water, for establishing the body of liquid or liquid environment adjacent the cones 20a of glass of the streams. The tank 52a is connected with a water or other liquid supply by a supply pipe 54a. A valve 104 associated with the supply pipe provides control for the liquid delivered into the container or tank 52a. The valve 104 may be manually controlled or may be an automatic valve associated with a liquid level control means (not shown) of conventional construction for maintaining a predetermined amount of liquid in the tank 52a. The trough 50a is equipped with a pipe 55a for returning liquid in the trough 50a to the tank 52a.

A manifold 57a is secured to a side wall 98 of the enclosure 96, the latter having passages or orifices 58a. The receptacle 52a has an outlet pipe 60a connected with a motor operated pump 61a, the outlet of the pump being connected by a pipe 63a with the manifold 57a. A heat exchanger, coil or means 64a is provided through which a cooling or heating medium may be circulated to maintain a desired temperature for the liquid in the tank 52a.

The arrangement includes means for returning the liquid flowing through the restricted passage 99 to the receptacle 52a. Disposed beneath the shield or enclosure 96 is a thinwalled, tubular rotatable member 106 journaled for rotation in bearings 108 carried by support means (not shown).

The rotating member 106 is generally cylindrical and its axis A-A of rotation is angularly disposed with respect to a vertical axis through the restricted passage 99, the angularity being such that liquid falling by gravity from the lower edge region 100 of the stationary enclosure or shield 96 will engage the inner wall surface of the rotatable sleeve 106.

The upper end of the rotatable sleeve 106 is fashioned with an inwardly extending flange 110 defining an opening 111 to accommodate the lower end region of the housing or shield 96. The rotatable member 106 is equipped with a sheave 112 connected by a driving belt 114 with a sheave 115 mounted upon a shaft 116 of an electrically energizable motor 118. Surrounding the lower region of the rotatable member 106 is a stationary liquid-collecting means or receptacle 120 having a circular side wall 121, a floor portion 123 and at its upper portion an inwardly extending flange 125 defining an opening 126 accommodating the rotatable member 106.

The lower end of the rotatable sleeve 106 is fashioned with an outwardly extending circular flange 128. During rotation of the sleeve or member 106, the water, delivered into the member through the passage 99 is influenced by centrifugal rotation of the sleeve and gravity to flow downwardly on the interior surface of the sleeve, around the lower end of the sleeve and along the lower surface 130 of the flange and is discharged by centrifugal forces into the receptacle 120.

The floor 123 of the receptacle is provided with an upwardly-extending frusto-conically shaped wall 132 which terminates adjacent but spaced from the surface 130 of the flange 128 on member 106. Through this arrangement, the water thrown outwardly from the rotating flange 130 into the receptacle 120 is collected on the interior surface of the inclined floor 123 and flows through a return pipe 134 into the tank 52a. The member 106 is disposed with respect to the direction of movement of the strand 24a so that the lower terminus 136 is engaged by the strand 24a and is effective to strip or wipe water from the strand.

In the performance of the method carried out by the apparatus shown in FIG. 3, the motor 118 is energized to effect rotation of the sleeve or member 106. The motor driving the pump 61a is energized to continuously deliver water from the tank 52a through the manifold 57a and passages 58a into the housing or enclosure 96. Water is fed into the housing 96 in a greater quantity than the amount of liquid discharged by gravity through the restricted passage 99 so that the level of the water in the housing 96 is maintained constant at the upper edge 102 of the housing 96. The excess water overflowing into the trough 50a is returned through the pipe 55a into the tank 52a.

As illustrated, portions of the cones of glass of the streams are below the level of the water or liquid environment whereby the fibers are quenched by the liquid as they are formed from the cones of glass. The environment provided by the water dissipates and conveys away heat from the cones of glass thereby increasing the viscosity of the glass to enable efficient attenuation of the streams to continuous filaments 22a. The filaments 22a move through the body of water in the housing 96 and are converged into a strand 24a by the guide surface defining the restricted passage 99, the winding of the strand on the rotating collector tube 30a being the medium attenuating the glass streams to filaments.

The engagement of the converged filaments at the inner surface of the restricted passage 99 strips off some of the water from the filaments. The rotating sleeve 106 is disposed so that the circular surface 136 at the terminus of the interior surface of the sleeve engages the strand 24a and is effective in wiping or stripping water from the strand so that there is a minimum of water on the strand 24a at the packaging or winding station. The water flowing downwardly through the restricted passage 99 is engaged with the inner surface of the rotating member 106 and centrifugal and gravitational forces influence the water to flow downwardly along the inner surface of member 106 thence outwardly along the lower surface 130 of the flange 128 and is discharged into the collector or receptacle 120.

The upwardly extending flange 132 on the floor 123 of the receptacle and the inclined floor direct the water into the pipe 134 and is returned into the tank 52a. The method is continuous and by reason of the quenching of the glass of the cones 18a and filaments in the water or liquid environment, the turbulence of the steam generated by the intense heat of the glass result in filaments having surface irregularities or roughness of the character shown in FIG. 12, such filaments having increased flexibility and other advantages hereinbefore mentioned.

FIG. 4 illustrates an arrangement similar to that shown in FIG. 1 and a method of and means for blending or delivering a gas or other material with the liquid, such as water, providing the liquid environment at the glass streams. The apparatus is inclusive of an electrically-heated stream feeder or bushing 10b in which pieces or marbles of glass are heated to a molten condition, or the feeder disposed beneath a forehearth and receiving refined glass from the forehearth channel.

The feeder floor is fashioned with rows of projections or tips 16b having passages or orifices through which streams 18b of glass are flowed from the feeder, the glass of the streams adjacent the orifices being in the form of cones 20b. The streams are attenuated to continuous filaments 22b by winding a strand 24b of the filaments upon a rotating collector 30b of a winding machine 26b to form a package 32b, a rotatable and reciprocable oscillator traverse 34b engaging the strand and distributing it lengthwise in the package in a conventional manner.

The arrangement for establishing and maintaining a body of liquid providing liquid environment at the region of delivery of the streams of glass from the feeder 10b includes a housing, enclosure or shield 36b, the housing being of inverted generally pyramidal shape having side walls 38b, one of which is shown, and end walls 40b. The streams of glass are delivered into the open end of the housing 36b. The lower end regions of the side and end walls provide or define a restricted passage or outlet 42b, the portions of the walls below the restriction being curved outwardly as shown at 44b.

The arrangement for delivering and maintaining liquid in the enclosure 36b includes a tank or receptacle 52b containing the liquid, such as water, for establishing the liquid environment adjacent the cones of glass and the filament-forming region. The tank 42b receives water from a supply through a pipe 54b, the level of the liquid in the tank being controlled by a conventional valve means as hereinbefore described. The upper edge 46b of the housing 36b determines the level of the liquid in the housing.

Surrounding the upper region of the housing 36b is a trough or receptacle 50b for collecting liquid overflowing the edge 46b, the liquid being returned to the tank 52b by a pipe 55b. Secured to one of the side walls 38b is a manifold 57b having passages 58b opening into the housing 36b, the manifold being connected with a pipe 138. A pipe 60b conveys water from the tank 52b to a pump 61b, driven by a motor 62b, an outlet pipe 63b being connected with the pump 61b.

The pipe 63b is connected with a T-shaped fitting 140, one side branch of the fitting 140 being connected with a chamber 142 of a blender or mixing device 144, the outlet 145 of the blender chamber being connected with the pipe 138.

The other branch of the fitting 140 is sealed to a housing of an electrically energizable motor 146. The motor shaft 148 extends through the T-shaped fitting 140 into the chamber 142, the portion of the motor shaft within the chamber 142 being equipped with blender blades or vanes 150. A pipe or tube 152 extends into the chamber 142, the pipe 152 being connected with a supply of gas, such as air, nitrogen or the like under pressure, the gas being delivered into the chamber 142 for blending into the liquid in the chamber 142. A valve 154 is connected with the pipe 152 for controlling the delivery of gas into the chamber 142.

A valve 156 may be provided in the liquid outlet pipe 63b from the pump for regulating the amount of liquid delivered through the blending chamber 142 to the liquid environment. Means is provided for returning the liquid moving downwardly through the restricted passage 42b at the lower end of the housing 36b to the tank 52b. A thin-walled cylindrically-shaped sleeve or tubular rotor 68b is journally supported upon suitable bearings 69b, the axis of rotation of the sleeve 68b being angularly disposed with respect to a vertical axis through the passage 42b.

The driving means for the rotatable sleeve 68b includes an electrically energizable motor 70b, the motor shaft having a sheave 72b connected by a belt 73b with a sheave 74b, the latter being secured to the exterior peripheral wall of the rotor 68b. The upper end of the rotor has an inwardly extending flange 76b defining an opening 77b accommodating the lower end of the housing 36b.

Surrounding the lower region of the rotatable sleeve 68b is an annular receptacle or collector 80b having an annular floor 81b and a circular wall 82b, a circular flange 86b being fashioned on the floor providing an opening 87b to accommodate the strand 24b. The receptacle 80b is connected with a liquid return pipe 90b extending into the tank 52b.

In a start-up operation, beads of glass form at the tips of the projections 16b. The beads fall by gravity with filaments trailing the beads. The operator, using a suitable tool inserted through the passage 87b, manually pulls the filaments through the passage 87b and initially winds a few turns of the strand of filaments 24b on the packaging collector 30b. The operator then energizes the motor 70b to rotate the sleeve 68b. The pump driving motor 62b is energized whereby the pump 61b feeds water or other liquid from the tank 52b to the fitting 140 through the chamber 142 and pipe 138 and manifold 57b into the housing 36b.

The motor 146 for rotating the blender blades 150 is energized and gas under pressure from a supply is fed into a chamber 142 through a pipe 152, the gas being mixed or blended with the liquid being delivered into the housing 36b. The housing fills up with liquid to the level determined by the edge 46b of the housing, the excess liquid overflowing the edge into the trough 50b and is returned by the pipe 55b to the tank 52b.

By blending or introducing gas into the liquid, an aerated liquid environment is established and maintained at the region of the cones 20b of glass of the streams to quench the cones of glass and the filaments as they are being attenuated from the glass streams. By regulating or proportioning the gas to the liquid being delivered into the housing 36b, the quenching effectiveness of the liquid on the glass streams and fibers may be varied to control the viscosity of the glass of the streams at the region of attenuation.

If the liquid dissipates more heat from the streams of glass than is desired, the amount of gas introduced into the liquid may be increased by manipulation of the valve 154 to thereby control the viscosity of the glass streams to secure the most efficient attenuation. The flow rate or amount of liquid delivered into the housing 36b may be regulated by the valve 156. The valve 156 is adjusted so that there is a continuous overflowing of the liquid over the edge 46b of the housing into the trough 50b so that the level of the liquid in the housing 36b is determined and maintained at the edge 46b of the housing.

The liquid moving downwardly by gravity through the restricted passage 42b is engaged by the rotating sleeve 68b and discharged from the flange 79b at the lower end of the sleeve into the collecting chamber 80b and the liquid returned to the tank 52b through the pipe 90b. Thus a continuous filament forming operation is carried on and the filaments moved through a liquid environment of a constant level and of controlled character as above explained. The temperature of the liquid may be varied or controlled by a heating or cooling medium circulated through a heat transfer coil or heat exchanger 64b.

If desired, a filament coating material may be delivered through the pipe 152 and blended with the liquid or water in the chamber 142 and the mixture flowed into the housing 36b. Through this method, a coating material contained in the water or other liquid may be applied to the filaments as they are drawn through the mixture of liquid and coating material.

FIG. 5 illustrates a modified form of apparatus for carrying out the method wherein water fed into a shield, enclosure or housing embracing the filaments and glass streams provides a liquid support for an oil or lubricant or a low density coating material for application to the newly attenuated filaments wherein the oil or other liquid supported by the water provides the medium for quenching the glass of the streams and the filaments formed therefrom.

The arrangement is inclusive of a stream feeder 158, the floor 159 of the feeder being fashioned with a plurality of orificed projections 160 through which flow streams of glass, the cones of the glass streams being indicated at 162.

A housing 164, similar to the housing 36 shown in FIGS. 1 and 2, is disposed beneath the stream feeder and receives the streams of glass. The upper edge 166 of the housing defines or determines the level of the liquid oil environment for the glass streams. The upper region of the housing is surrounded by a trough 168 which receive the oil overflowing the edge 166, the trough being equipped with a pipe 170 to return the excess oil to a pump (not shown) for recirculation. One wall 172 of the housing or enclosure 164 is provided with a manifold 174 in communication with the interior of the housing through passages 175.

In this form of the invention, the water 176 occupies a region in the housing 164 below the glass stream while oil or a different liquid 178 of lesser density than the water occupies the upper region of the housing. For example, if it is desired to coat the filaments 180 attenuated from the glass streams, a coating liquid, such as oil 181 or a low density resin is maintained above and supported by the body of water 176 in the housing.

The height of the water 176 in the housing is automatically controlled so as to maintain the liquid environment of oil or low density coating liquid adjacent the glass streams to effect a quenching of the cones of glass and the filaments by the liquid 178 above the body of water.

The control means illustrated for maintaining a predetermined level for the body of water 176 in the housing is float-controlled but other means may be employed which is responsive only to characteristics of water. As illustrated, a float member 182 is supported by an arm or lever 183, the latter being mounted by a thin flexible diaphragm 185 of rubber or the like sealingly secured in an opening in the wall 172 of the housing.

The lever or member 183 is connected with a control mechanism of conventional construction contained within a housing 187. The means in housing 187 may be of the electric control type for actuating a reversible motor 189 operating an adjustable valve 190 associated with a water supply pipe 192 connected with a water supply. Through this arrangement the body of water 176 in the housing 164 is maintained at a predetermined level through the action of the float 182 controlling the motor operated valve 190.

The oil, low density resin or other filament coating material suitable for quenching the cones of glass and filaments may be supplied through a pipe 194 connected with a supply of oil or filament coating material which may be delivered by a pump (not shown) into the region of the enclosure 164 above the body of water 176. A control valve 195, which may be a manually actuated or an automatically controlled valve is interconnected with the pipe 194 for regulating the rate of delivery of the oil or other coating liquid into the enclosure 164.

The rate of delivery of the oil or other coating liquid is controlled so that oil continuously overflows the upper edge 166 of the enclosure 164 so that the level of the oil is maintained constant at the regions of the cones 162 of glass.

In the arrangement shown in FIG. 5, the fibers or filaments and the lower regions of the cones of glass are quenched by the oil or other liquid superposed upon the body of water 176 in the enclosure 164. Through this arrangement the cones of glass and filaments are quenched and may be simultaneously coated with the oil or other coating.

The lower end of the enclosure may be fashioned in the manner of the lower ends of the enclosures in forms shown in FIGS. 1 through 4 hereinbefore described. The filaments 180 may be converged into a strand and wound into a package in the manner hereinbefore described, the winding of the strand performing the function of attenuating the glass streams to filaments.

FIGS. 6 and 7 illustrate a modified arrangement for establishing and maintaining a liquid quenching environment at the region of attenuation of the cones of glass to filaments. As shown in FIG. 6, the arrangement is inclusive of a stream feeder 198 having terminal lugs 199 to which are connected current conductors 200 for maintaining glass in the feeder 198 in a desired flowable condition. The stream feeder is fashioned with depending projections 200 having passages providing outlets or orifices through which flow streams of glass, the regions of the glass streams adjacent the projections or tips 200 being in the form of glass cones 202.

Disposed beneath the stream feeder 198 is a housing or enclosure 204 which is of inverted pyramidal shape similar to the housing 96, the side walls 205 and end walls 207 converging to form a restricted passage similar to the restricted passage 99 shown in FIG. 3. The housing 204 is supplied with water or other quenching liquid in an amount and at a rate so that the water overflows the upper edge 206 of the housing, the edge 206 defining a constant level for the liquid in the housing. As will be seen from FIG. 6, portions of the cones 202 of the glass streams are beneath the level of the water in the housing.

The upper region of the housing is surrounded by a member 208 forming a trough or moat 209 provided with a pipe 210 for returning excess water to a tank such as the tank 52a shown in FIG. 3. A modified arrangement for delivering water or other quenching liquid into the housing 204 is illustrated in FIGS. 6 and 7. Mounted parallel with the stream feeder is a water supply manifold 212 which is connected with a pump of the character shown at 61a in FIG. 3, the pump receiving water from a tank such as the tank 52a containing a supply of water.

Disposed between each of the transverse rows of cones of glass of the streams flowing from the stream feeder is a tubular member 214 preferably of elongated or flat configuration in cross section as shown in FIGS. 6 and 7, each member 214 forming a chamber 216. The flat tubular members 214 are preferably supported by the manifold 212, the members receiving water from the manifold through passages 217 in the wall of the manifold.

Each of the side walls 218 of each tubular member 214 is fashioned with a slot or passage 220, the wall portions defining the passages 220 being inclined downwardly as shown in FIG. 7 so as to direct water or quenching liquid onto the cones 202 of glass slightly above the level of the body of water defined by the upper edge 206 of the housing 204. In this method and arrangement, the quenching water is delivered from a pump under pressure to the manifold 212 and to the members 214 whereby sprays or jets of water are projected from the passages 220 onto the cones 202 of glass slightly in advance of immersion of the glass of the cones in the body of water contained in the housing 204.

The quantity of water delivered to all of the passages 220 is slightly in excess of the flow of discharge of water through the restricted passage at the lower end of the housing 204 so that the water level is always maintained at the edge 206 of the housing, the excess water flowing into the trough 209 being returned through the pipe 210 to the water supply tank. Thus an environment of water spray is established in addition to the body of water in the housing 204 whereby to transfer heat away from the glass streams more rapidly and thereby increase the viscosity of the glass of the cones to provide for efficient attenuation of the glass to filaments.

Through this method and arrangement the glass in the feeder may be maintained at a higher temperature whereby a more liquidus glass or glass of a lower viscosity is flowed through passages in the projections 200 fostering the flow of glass streams of more uniform size.

The water of the sprays or jets and the water in the housing 204 adjacent the cones of glass is volatilized into steam by the high temperature of the glass and filaments have roughened or irregular surfaces, as shown in FIG. 12, due to the turbulence of the steam contacting the cones of glass at the region of attenuation. By immersing the lower portions of the tubular members 214 in the body of water in the housing 204, the members 214 are additionally cooled by the body of water.

FIG. 8 illustrates a modified form wherein an inert gas environment may be established and maintained above the body of liquid employed for quenching the glass of the streams and filaments attenuated therefrom. The arrangement shown in FIG. 8 is similar to the arrangement shown in FIG. 2 and is inclusive of an electrically heated stream feeder 10c containing molten glass and having depending projections 16c provided with passages through which flow streams 18c of glass, the cone configurations of the glass streams being indicated at 20c.

The filaments 22c, attenuated from the glass streams, are drawn downwardly through a body of quenching liquid such as water contained in a housing 36c, the latter being of inverted pyramidal shape. The upper edge 46c of the housing 36c defines the level of the water in the housing 36c, the excess water flowing over the edge 46c is collected in a trough 50c provided by a member 48c surrounding the upper region of the housing 36c. The water in the trough 50c is returned to a tank, such as the tank 52 shown in FIG. 1, through a return pipe 55c.

Secured to one wall of the housing 36c is a manifold 57c, the adjacent portion of the housing wall being fashioned with passages 58c through which water from the manifold 57c flows into the housing 36c. A water supply pipe 63c connects the manifold with a water pump, such as the pump shown at 61 in FIG. 1, for delivering water to maintain the housing 36c filled with water. The end region of the converging walls of the housing 36c defines a restricted passage similar to the passage 42 shown in FIG. 1, the wall of the passage converging the filaments into a strand and the strand wound into a package. Water in the housing 36c flows through the restricted passage for return to a water tank through an arrangement such as that illustrated in FIG. 1.

Means is provided for establishing a gaseous environment above the body of liquid in the housing 36c. A metal screen 222 of rectangular shape surrounds the orificed projections 16c, the upper edge of the screen being close to or in contact with the floor of the stream feeder 10c, the lower portion of the screen being immersed in the water contained in the housing 36c. The immersion of a portion of the screen in the water serves to cool the screen. Pipe 224 extends through the screen and is adapted to be connected with a supply of gas, preferably an inert gas such as nitrogen or carbon dioxide, to provide a gaseous environment at the region of the projections 16c and the cones of glass 20c.

Through this arrangement the region of the projections and the cones of glass is substantially isolated from the atmosphere. The gas delivered into the screened region through the pipe 224 is under comparatively low pressure sufficient to prevent atmospheric air entering the region embraced within the screen 222. While an inert gas is preferred, it is to be understood that other gases may be delivered into the screened region.

Figure 9:
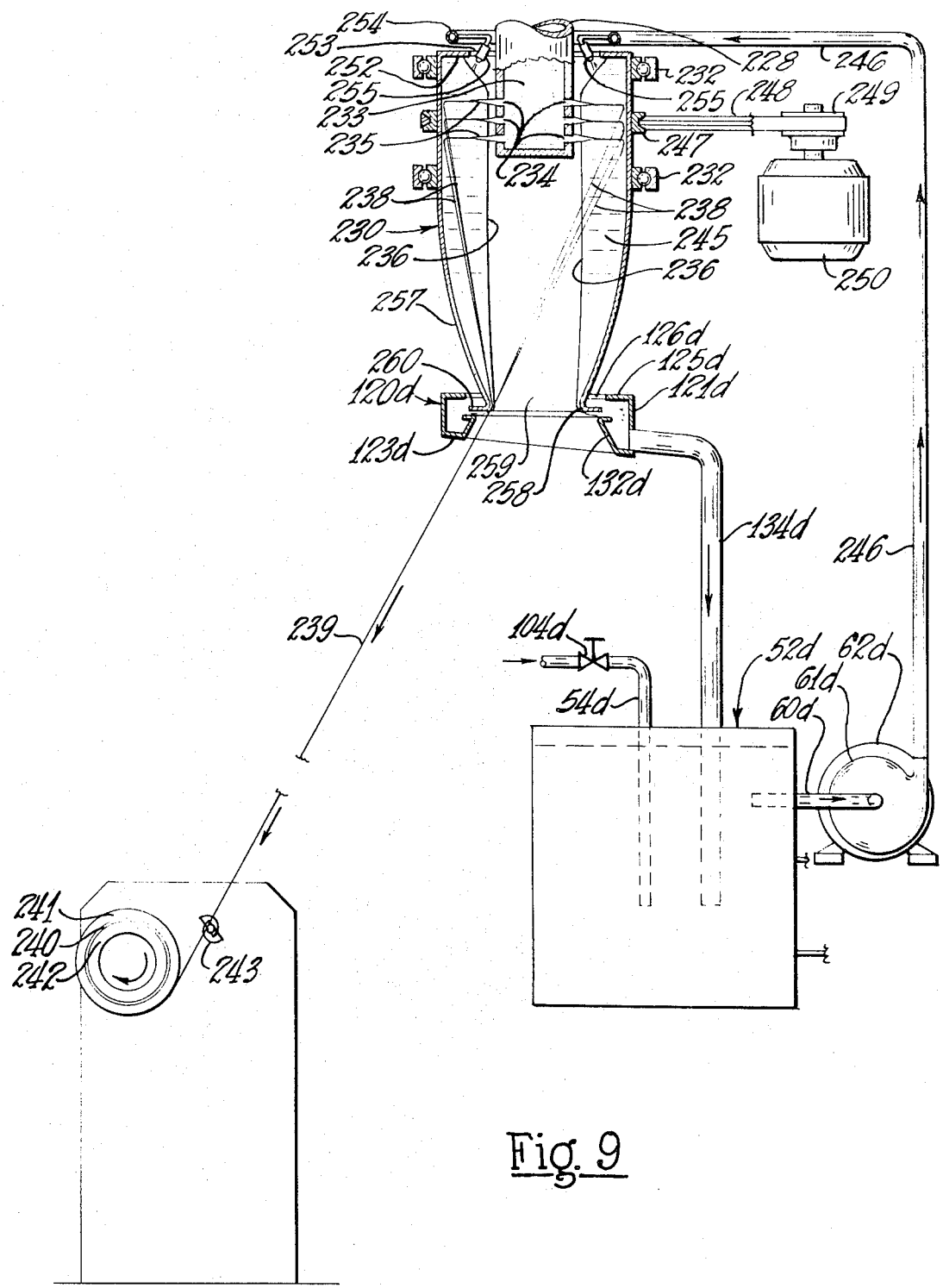
FIG. 9 is a schematic elevational view illustrating processing centrifuged fibers or filaments through the method of the invention.

FIG. 9 illustrates a method of an arrangement for quenching streams of glass and filaments formed therefrom where the streams of glass are projected by centrifugal forces from a rotor or spinner. In this form, the housing or enclosure containing the body of liquid providing the liquid environment is rotatable. The rotatable rotor or spinner 228 is mounted upon suitable bearings (not shown), the rotor being rotated by a motor (not shown).

An enclosure or housing 230 is mounted in suitable antifriction bearings 232 for rotation preferably about the axis of the spinner or rotor 228. The rotor 228 is adapted to contain molten glass 233 which may be flowed from a forehearth of a glass furnace (not shown) in a conventional manner. The peripheral wall of the hollow rotor or spinner 228 is fashioned with a plurality of circumferentially spaced passages or outlets 234 through which streams 235 of the molten glass are projected under the influence of centrifugal forces of rotation of the spinner.

The glass streams at the exit region of the spinner are in the form of cones 236. The centrifugal forces attenuate the streams of glass to continuous filaments 238 which are converged into a strand 239, the latter being wound upon a rotating collector tube 240 into a package of strand 241 at a winding station. The collector tube 240 is mounted upon a mandrel or collet 242 rotated by a motor in the manner illustrated in FIG. 1, the strand being guided and distributed on the package by a rotating and reciprocating oscillator traverse 243 of conventional construction.

The rotatable housing 230 is adapted to contain a body of water 245 for quenching the cones of glass and the filaments or fibers 238 formed therefrom. The water for quenching the filaments is contained in a tank 52d which is supplied with water from a supply through a pipe 54d, a control valve 104d being associated with the pipe 54d for regulating delivery of water into the tank 52d. The outlet pipe 60d conveys water from the tank to a centrifugal pump 61d, an outlet pipe 246 conveying the water from the pump for delivery into the rotatable housing 230.

The rotatable housing 230 is equipped with a sheave 247 engaged by driving belt 248 driven from a sheave 249 mounted on the shaft of an electrically energizable motor 250. The upper end of the housing 230 is fashioned with an inwardly extending flange 252 defining a circular opening 253. spinner Disposed adjacent the flange 252 of the housing 230 is a circular manifold 254 connected with the pipes 246. Supported by the manifold is a plurality of nozzles 255 which receive water from the manifold 254, the nozzles delivering the water downwardly and outwardly of the axis of the spinnder into the rotatable housing 230.

The downwardly and outwardly directed forces of the water from the nozzles or jets 255 modifies the interior contour of the upper region of the annular body of water 245 contained in the housing 230. The lower region of the housing 230 has a progressively inwardly curved wall region 257 which terminates in a neck portion 258 defining a passage 259, the lower end of the housing 230 having an outwardly extending flange 260.

Disposed beneath and embracing a lower end region of the housing 230 is a water collecting receptacle 120d of the general configuration of the receptacle 120 shown in FIG. 3. The receptacle 120d has an inclined floor portion 123d, a circular wall 121d and an upper flange 125d defining an opening 126d which accommodates the end region of the housing 230. The floor 123d is fashioned with an upwardly extending frusto-conically shaped wall 132d, the flange 260 at the end of the housing 230 being adjacent but spaced from an outwardly extending flange at the upper edge of the wall 132d.

The collector or receptacle 120d is connected by a pipe 134d with the tank 52d. The filaments 238 are converged at a region of the neck 258 into a strand or bundle 239.

It should be noted that the filaments 238 are quenched by the body of water 245 in the rotatable housing 230 and a substantial amount of water on the filaments is stripped therefrom by engagement of the filaments with the interior surface of the neck 258 of the housing. The rotor or spinner 228 may be rotated in the same or opposite direction from the direction of rotation of the housing 230.

The method of operation of the arrangement illustrated in FIG. 9 is as follows: The motor 250 is energized to rotate the housing 230. The motor 62d is energized to drive the pump 61d conveying water under pressure through the pipe 246 to the manifold 254, the water being delivered or projected from the nozzles 255 into the housing 230. As the housing 230 is rotating, the water builds up by centrifugal forces to a generally annular body of water 245 with the neck 258 defining approximately the minimum interior diameter of the annular body of water.

The rotor or spinner 228 into which molten glass is being delivered is rotated by a motor (not shown) at a speed to project the molten glass through the peripheral passages or orifices 234 forming individual streams of glass under the influence of centrifugal forces, the cones 236 of the glass streams being projected into the body of water 245. As the glass of the cones rapidly loses heat transferred to the water adjacent the cones of glass, the glass of the streams and the filaments 238 are rapidly quenched. The filaments 238 attenuated from the streams by centrifugal forces move through the body of water and are converged at the neck 258 into a strand or bundle 239 and the strand collected in a wound package 241.

The rapid quenching of the cones of glass adjacent the rotating spinner causes turbulance of the water and the steam produced by the heat of the glass, and such turbulance is believed to impart the irregular or roughened surfaces to the filaments of the character shown in FIG. 12. Under the influence of the centrifugal forces of rotation of the housing 230 and the force of gravity acting on the body 245 of water, the water moves around the neck 258 in the form of a film, the water moving outwardly along the lower surface of the flange 260 being discharged into the collector or receptacle. 120d and returned through the pipe 134d into the tank 52d.

It will thus be seen that after initial start-up, the process is continuous. In start-up, the spinner delivers the streams of glass outwardly by centrifugal forces to form the filaments and the operator grasps the filaments into a strand and initiates winding of the strand on the forming tube 240 and energizes the motor driving the collet 242. The filaments and the glass of the streams are quenched when sufficient water accumulates in the housing 230 to form the annular body of water 245.

Figures 10, 11:
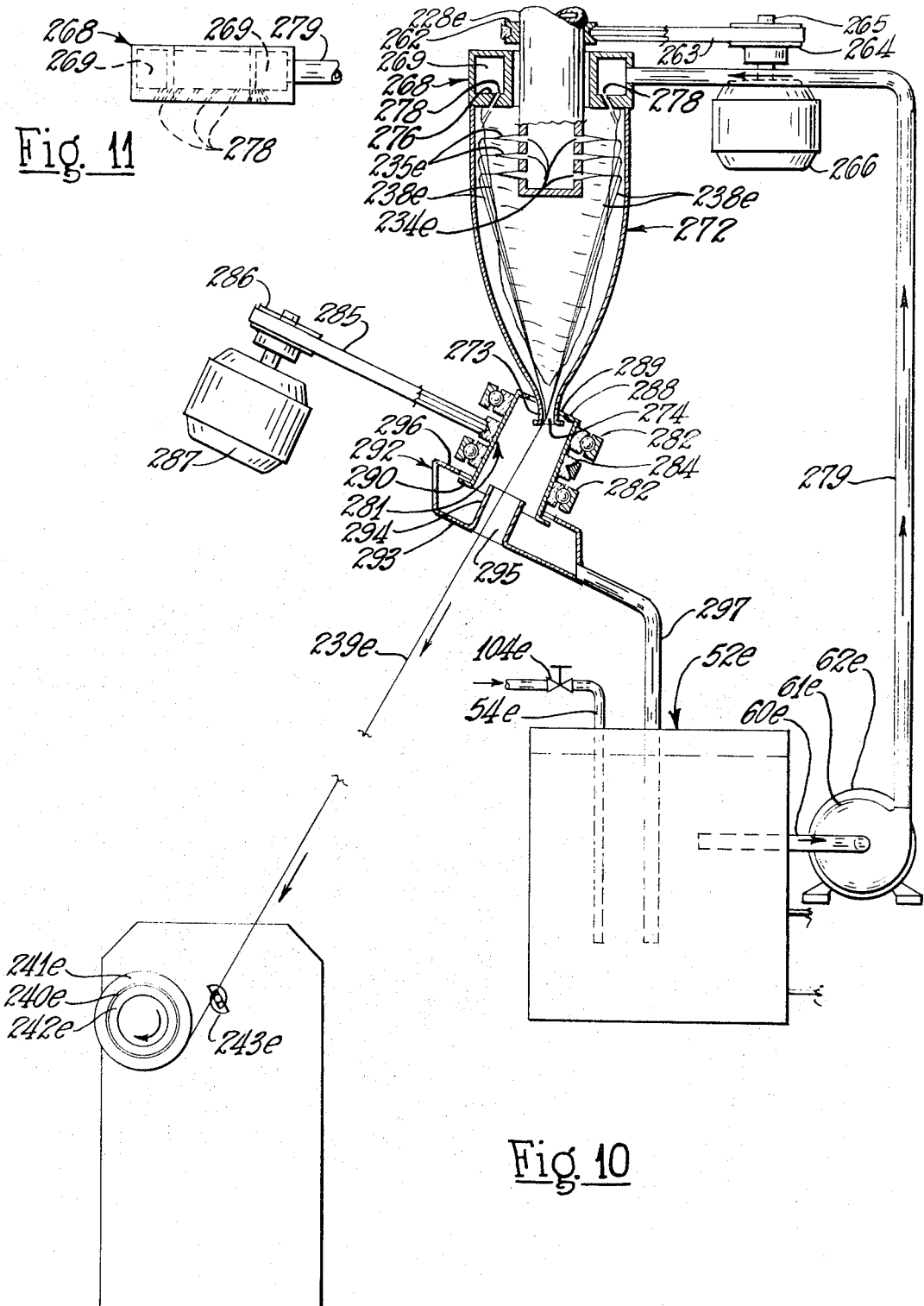
FIG. 10 is a semi-schematic view partly in section illustrating a modified form of apparatus for processing centrifuged filaments.
FIG. 11 is an elevational view of one of the components illustrated in FIG. 10.

FIGS. 10 and 11 illustrate a modified arrangement of apparatus for forming centrifugal filaments and quenching the glass streams and filaments attenuated from the glass streams at a region adjacent a rotating spinner.

The arrangement shown in FIG. 10 is inclusive of a rotating hollow spinner 228e which receives and contains molten glass, the spinner or rotor having a peripheral wall portion fashioned with circumferentially spaced openings or orifices 234e through which the glass in the spinner is delivered or projected as streams 235e. The glass may be delivered into the hollow rotor 228e from a forehearth or other supply of heat-softened glass.

The spinner 228e is equipped with a sheave 262 connected by a driving belt 263 with a sheave 264 mounted upon the shaft 265 of an electrically energizable motor 266. The motor 266 rotates the spinner 228e at a speed to develop centrifugal forces effective to project streams 235e of glass from the orifices. Surrounding a portion of the rotor above the orifices 234e is a relatively-stationary annular manifold 268 providing an annular manifold chamber 269. Supported by and depending from the annular manifold 268 is a housing or enclosure 272 of circular cross section, the lower region being of progressively reduced cross section forming a neck portion 273 defining a restricted passage 274.

The floor 276 of the manifold 268 is fashioned with a circular row of passages 278 which are slanted downwardly and outwardly away from the axis of the rotor 228e and, as shown in FIG. 11, are spirally arranged or disposed askew with respect to the axis of the rotor.

The water supplied to the manifold chamber 269 under pressure is delivered through the channels or passages 278 into the housing 272, the compound angularities of the passages 278 directing jets of water toward the inner wall surface of the housing 272 and in a spiral direction by reason of the spiral inclination of the channels 278 as shown in FIG. 11.

A tank or reservoir 52e contains water or other liquid for quenching the fibers or filaments, and a pipe 54e, provided with a control valve 104e, is connected with a water supply for maintaining the tank 52e substantially filled with water. A pipe 60e extending into the tank 52e is connected with a water pump 61e driven by an electrically energizable motor 62e. The outlet pipe 279 of the pump 61e is connected with the manifold 268. Water or quenching liquid, under pressure from the pump 61e, is delivered into the manifold 269 and is projected through the passages or nozzles 278 along the interior wall of the housings 272 for quenching the filaments 238e being attenuated from glass of the streams 235e.

The fibers of filaments 238e are converged into a bundle or strand 239e by engagement with the interior surface of the neck portion 273 at the lower end of the housing 272. The strand 239e is wound upon a forming or collecting tube 240e to form a wound package of strand 241e, the forming tube being mounted upon a rotatable collet 242e, of a winding machine driven by a motor as illustrated in FIG. 1. The strand is guided and distributed onto the package by a rotating and reciprocating traverse 243e.

Means is disposed adjacent the restricted passage 274 of the housing 272 for collecting water flowing downwardly through the passages and returning the water to the tank 52e. The means is inclusive of a tubular member or sleeve 281 journally supported for rotation in antifriction bearings 282. The sleeve 281 is equipped with a sheave 284 connected by a belt 285 with a sheave 286 mounted upon the shaft of a drive motor 287. The upper end of the tubular member 281 is fashioned with an inwardly extending flange 288 defining an opening 289 accommodating the lower end of the housing 272. The lower end of the tubular member is fashioned with an outwardly extending circular flange 290.

Disposed beneath the tubular member 281 is a collector or receptacle 292 having a floor 293 fashioned with an inwardly-extending cylindrically-shaped wall 294 defining a passage 295 to accommodate traverse of the strand 239e of filaments toward the package forming station. The receptacle 292 has at its upper region an inwardly extending flange 296 disposed slightly above and spaced from the flange 290 on the rotatable sleeve 281. A pipe 297, connected with the receptacle 292, extends into the tank 52e for returning water or other quenching liquid in the receptacle 292 to the tank 52e.

The method of operation of the arrangement shown in FIG. 10 is as follows: The motor 266 is energized to rotate the spinner or rotor 228e to project streams of glass 235e from the orifices in the rotor, the centrifugal forces attenuating the streams to continuous filaments 238e.

The operator, by means of a suitable tool inserted through the passages 274 and 295, gathers the descending filaments into a strand 239e and initiates winding of the strand on the forming tube 240e at the winding station and energizes the motor (not shown) for rotating the forming tube 240e.

The motor 62e is energized to drive the pump 612. The pump receives water from tank 52e through the tube 60e and flows the water through the pipe 279 under pressure to the manifold chamber 269. The water in the manifold is projected through the angularly disposed passages 278 into the housing 272 and into contact with the filaments 238e for quenching the filaments. The motor 287 is energized to rotate the tubular member 281, the water discharged through the restricted passage 274 engaging the inner surface of the rotating member 281.

Rotation of the member 281 causes the water on the surface of the member to be discharged outwardly of the flange 290 into the receptacle 292 and the collected water returned through pipe 297 into the tank 52e. The filaments 238e are converged at the neck 273 defining the passage 274 and the strand of filaments engages the inner surface of the neck 273 which strips or wipes some of the water from the filaments so that there is a minimum of water on the strand 239e.

As the water delivered through the passages or jets 278 is directed both outwardly and spirally of the axis of the rotor, and as the water in the housing 272 establishes a drag upon the centrifuged filaments 238e, turbulence is set up whereby steam developed by heat from the glass engages the streams of glass at the region of attenuation to quench the filaments and the adjacent regions of the glass streams from which the filaments are attenuated.

FIGS. 13 through 15 illustrate an arrangement for maintaining foam at the stream flow region of a stream feeder to provide a liquid quenching environment for the cones of glass of the streams and the filaments attenuated therefrom. A foam suitable for the purpose comprises a dispersion of gas in a volatilizable liquid. The arrangement is inclusive of a stream feeder 300 which is electrically heated to maintain glass therein in a flowable condition. The floor of the feeder is fashioned with depending projections or tips 301, each having a passage 302 through which flows a stream 303 of glass from the feeder.

The regions of the glass streams adjacent the projections are in the form of cones 303. The glass streams are attenuated to filaments 304 by winding a strand of the filaments on a rotating forming tube as in the other forms of apparatus disclosed. Disposed at each side of the stream feeder is an enclosure 306 defining a chamber 307 into which foam is delivered. Each of the enclosures is fashioned with end walls 309, upper and lower walls 310 and 311 and a rear wall 312.

Each chamber 307 opens adjacent the stream flow region of the feeder as shown in FIG. 13. The enclosures 306 are preferably fashioned of metal such as copper so that they may be readily cooled and maintained at a safe operating temperature. Secured to the rear wall 312 of each enclosure 306 is a U-shaped tubular means or pipe 314 having parallel sections 315 joined by a semicircular loop 316. Cooling water or other fluid is circulated through the tubular means 314 to convey heat away from the walls of the enclosures 306.

A tube 318 is connected with the rear wall 312 of each enclosure or unit 306, the tube 318 being connected with a supply of foam for delivery into each chamber 307. The foam is delivered from a supply under comparatively low pressure and the rate of delivery of the foam is controlled by a conventional valve means 320 associated with each of the tubes 318. Baffle means is preferably disposed in each of the chambers 308 for distributing the foam throughout the chamber 307. The baffle means in each chamber 307 comprises a member 321 disposed in the position shown and supported by bolts 322 threaded into openings in each rear wall 312.

Spacing collars 324 are disposed between the baffle member 321 and the rear wall 312 to position the baffle at a distance from the rear wall 312, as shown in FIG. 13. The foam, delivered through the tube 318 in each unit, is dispersed and distributed by the baffle 321 so that the chamber 307 is maintained substantially filled with foam.

The continuous feeding of foam into the chambers 307 moves the foam in the chambers into the stream flow region beneath the stream feeder 300 whereby the foam encompasses the cones 303 of glass of the streams and the filaments 304 attenuated from the streams.

The liquid of the foam, subjected to the heat from the glass streams and from the adjacent region of the stream feeder, is volatilized and sets up turbulence whereby the cones of glass and the filaments formed therefrom are quenched during attenuation of the streams of filaments. The foam is of low density and the attenuated filaments move through the foam without materially affecting the quantity of foam maintained at the region below and adjacent the stream feeder.

The foam does not adhere to the filaments but the liquid component is continuously volatilized by the heat from the glass streams and hence there is no appreciable movement of the foam away from the stream flow and filament attenuating region.

In order to prevent premature heating of the foam in the chambers 307, additional cooling means may be employed, as it is undesirable to encounter volatilization of the liquid component of the foam prior to its delivery adjacent the glass streams. As shown in FIG 13, a plurality of flat tubes or tubular members 326 are disposed in spaced relation at the outlet region of each chamber 307. The tubes 326 are connected with a water supply manifold 328 connected with a supply of cooling liquid such as water circulated through the tubes 326 to thereby avoid premature heating of the foam.

Any suitable foam having a volatilizable liquid component may be employed. For example, a foam suitable for the purpose comprises a composition containing 5 to 7 percent pearl starch; 0.2 percent cationic lubricant, such as octadecyl amine acetate; 1 percent to 3 percent mineral oil or vegetable oil; up to 1 percent carboxyl methyl cellulose and about 0.2 percent of Tween 81 (polyoxyethylene sorbitan monooleate); the remainder of the composition being a liquid, such as water.

The composition is prepared by cooking the pearl corn starch at 210° F in water. In a separate container, the Tween 81 (polyoxyethylene sorbitan monooleate) is mixed with hydrogenated vegetable oil, carboxyl methyl cellulose and cationic lubricant and water slowly added with mixing until an emulsion is produced. Additional water is added slowly after the emulsion inverts to form a stable oil-in-water emulsion. This emulsion is blended with the starch solution prepared as above described and additional water added to provide the percent of solids indicated above.

Corn starch, potato starch, tapioca starch, and other types can be used in lieu of the pearl starch in the above example. Any suitable mineral or vegetable oil may be used including whale oil. Any suitable foaming agent can be substituted for the Tween 81 (polyoxyethylene sorbitan monooleate) such as Triton X–100 (isooctyl phenyl polyethoxy ethanol), sulphated mineral oils and other well known emulsifying and foaming agents.

Through the foregoing arrangement the cones of glass and filaments attenuated therefrom are quenched by the volatilized liquid of the foam maintained adjacent the cones of glass and the attenuated filaments. The attenuated filaments are drawn through the foam without disturbing the foam liquid environment at the stream delivery region of the feeder and the attenuating region of the filaments.

Filaments of various sizes may be produced according to the method of the invention dependent upon the end use for the filaments. Finer filaments are usable for fabricating textiles and coarser filaments are particularly usable as reinforcement for plastic. The filaments may be of sizes in a range of about ten hundred thousandths of an inch to seventy-five hundred thousandths of an inch.

The method of the invention provides for rapid quenching of the cones of glass of the glass streams and the filaments at the attenuating region whereby a roughened or irregular surface such as that illustrated in FIG. 12 is fashioned on the filaments, the roughened surfaces providing the advantages hereinbefore mentioned are attained through the roughened surfaces of the filaments. The filaments exhibit improved flexibility and larger surface areas whereby relative movement of adjacent filaments is resisted by reason of the tendency for interengagement or interlocking of the lands and recesses on the filament surfaces.

It is apparent that, within the scope of the invention, modifications and different arrangements may be made other than as herein disclosed, and the present disclosure is illustrative merely, the invention comprehending all variations thereof.

I claim:

1. Apparatus for processing glass including, in combination, a receptacle containing a supply of heat-softened glass, said receptacle having openings through which bodies of the heat-softened glass are delivered from the receptacle, a walled enclosure receiving the streams, means for delivering liquid from a supply to the enclosure, means for maintaining the liquid in the enclosure at a region quenching the bodies of glass by the liquid, said enclosure having a restricted outlet through which liquid is discharged from the enclosure, and means disposed to receive liquid from the restricted outlet for returning the discharged liquid to the supply.

2. The combination according to claim 1 wherein the means for returning liquid to the supply includes a hollow rotatable member into which liquid flows from the restricted outlet, a collector disposed to receive liquid from the hollow member, and means for rotating the hollow member to influence the delivery of liquid from the member into the collector.

3. Apparatus for processing glass to form filaments of glass including, in combination, a stream feeder containing a supply of molten glass, said feeder having passages in a wall thereof through which flow streams of glass, an enclosure disposed adjacent the feeder into which the streams are delivered, said enclosure having a restricted outlet, means for attenuating the streams of glass to filaments, said filaments passing through the restricted outlet, means providing a supply of liquid, means for delivering liquid from the supply into the enclosure at a rate to maintain liquid in the enclosure at the region of the streams to quench the streams and the filaments by the liquid, and means for returning liquid delivered from the enclosure to the supply.

4. Apparatus for processing glass in the formation of filaments including, in combination, a stream feeder containing heat-softened glass, said stream feeder having openings through which flow means of the heat-softened glass from the stream feeder, an enclosure receiving the streams of heat-softened glass, means for attenuating the streams to filaments, tubular means for supplying a first liquid to the enclosure at a region in the enclosure below the glass streams, tubular means for delivering a second liquid of lesser density than the first liquid into the enclosure above the first liquid, and means for maintaining the second liquid at a level so that the glass streams are immersed in the second liquid for quenching the streams and filaments formed therefrom.

5. Apparatus for processing heat-softened glass to form filaments of the glass including, in combination, a hollow rotor containing heat-softened glass, means for rotating the rotor, a wall of the rotor having orifices through which bodies of glass are delivered through the orifices by centrifugal forces, the centrifugal forces attenuating the bodies to filaments, a housing surrounding the rotor, means for delivering a liquid from a supply into the housing and into the region of the projected bodies to quench the bodies by the liquid, and means disposed to receive liquid from the housing for returning liquid flowing from the housing to the supply.

6. The combination according to claim 5 including means supporting the housing for rotation, and means for rotating the housing.

7. The method of forming fibers of heat-softened glass, including establishing a supply of the heat-softened glass, flowing streams of the glass from the supply into a body of quenching liquid, attenuating the streams of fibers, immersing the streams of glass in the body of quenching liquid to quench the streams of glass and to quench the fibers attenuated therefrom, and advancing the quenched fibers through a second body of liquid of greater density supporting the body of quenching liquid.

8. The method according to claim 7 including the step of coating the quenched fibers with the liquid of the second body.

9. The method of forming fibers of heat-softened glass including establishing a supply of heat-softened glass, flowing streams of the glass from the supply into a body of quenching liquid, attenuating the streams to fibers, maintaining the body of quenching liquid at a level in which the streams of glass are immersed to quench the glass of the streams and to quench the fibers attenuated therefrom, and delivering an inert gas into the region of the streams of glass between the body of quenching liquid and the supply of glass to isolate unimmersed regions of the streams from the atmosphere.

10. The method of forming fibers of heat-softened glass including establishing a supply of heat-softened glass, flowing streams of the heat-softened glass from the supply, attenuating the streams to fibers, advancing the glass of the streams in a softened state and the fibers attenuated therefrom into and through a body of quenching liquid to quench the glass of the streams and the fibers, and delivering streams of the quenching liquid into the body of liquid adjacent the glass streams to maintain the body of liquid at a predetermined level.

11. The method of forming fibers of molten glass including establishing a supply of molten glass, flowing streams of molten glass from the supply into a body of foam embodying a volatilizable liquid component, attenuating the streams to fibers, immersing the streams of glass in a molten state and the fibers being attenuated therefrom in the body of foam embodying a volatilizable liquid component to quench the glass of the streams and the fibers, and advancing the fibers through the body of foam.

12. Apparatus for processing glass in the formation of fibers of glass including, in combination, a feeder containing heat-softened glass, said feeder having openings through which streams of the heat-softened glass are flowed from the feeder, means attenuating the glass streams to fibers, a walled enclosure embracing the streams, a quenching liquid in the enclosure into which the streams of glass in a softened condition are delivered to quench the glass of the streams and the attenuated fibers, said enclosure having a restricted outlet for the quenching liquid, and means supplying quenching liquid to the enclosure at a rate substantially the same as the rate of flow of the quenching liquid through the restricted outlet to maintain the level of quenching liquid substantially constant in the enclosure.

13. The combination according to claim 12 wherein the walled enclosure is rotatable, and means for rotating the enclosure.

14. An attenuated fiber of glass having a surface configuration of random distribution of lands and recesses of irregular shape effected through quenching the glass of the fiber while in a softened condition.

* * * * *